(12) United States Patent
Srivastava et al.

(10) Patent No.: US 7,541,589 B2
(45) Date of Patent: Jun. 2, 2009

(54) SCINTILLATOR COMPOSITIONS BASED ON LANTHANIDE HALIDES, AND RELATED METHODS AND ARTICLES

(75) Inventors: Alok Mani Srivastava, Niskayuna, NY (US); Steven Jude Duclos, Clifton Park, NY (US); Lucas Lemar Clarke, Brussels (BE); Holly Ann Comanzo, Niskayuna, NY (US); Qun Deng, Shanghai (CN)

(73) Assignee: General Electric Company, Niskayuna, NY (US)

( * ) Notice: Subject to any disclaimer, the term of this patent is extended or adjusted under 35 U.S.C. 154(b) by 44 days.

(21) Appl. No.: 11/479,699

(22) Filed: Jun. 30, 2006

(65) Prior Publication Data

US 2008/0001087 A1 Jan. 3, 2008

(51) Int. Cl.
*G01T 1/20* (2006.01)
(52) U.S. Cl. .............. 250/361 R; 250/367; 250/483.1
(58) Field of Classification Search ............. 250/361 R, 250/367, 483.1
See application file for complete search history.

(56) References Cited

U.S. PATENT DOCUMENTS

| | | | |
|---|---|---|---|
| 4,437,006 A * | 3/1984 | Morgan et al. | ......... 250/363.02 |
| 4,687,153 A | 8/1987 | McNeil | |
| 5,104,155 A | 4/1992 | Kirkwood | |
| 5,213,712 A | 5/1993 | Dole | |
| 5,565,033 A | 10/1996 | Gaynes et al. | |
| 5,869,836 A | 2/1999 | Linden et al. | |
| 5,882,547 A | 3/1999 | Lynch et al. | |
| 6,302,959 B2 | 10/2001 | Srivastava et al. | |
| 6,308,909 B1 | 10/2001 | McNeil et al. | |
| 6,437,336 B1 | 8/2002 | Pauwels et al. | |
| 6,488,226 B2 | 12/2002 | McNeil et al. | |
| 6,585,913 B2 | 7/2003 | Lyons et al. | |
| 6,624,420 B1 | 9/2003 | Chai et al. | |
| 6,624,422 B2 | 9/2003 | Williams et al. | |
| 6,706,212 B2 | 3/2004 | Venkataramani et al. | |
| 2003/0226928 A1 | 12/2003 | McNeil et al. | |
| 2005/0082484 A1 | 4/2005 | Srivastava et al. | |
| 2005/0104002 A1 | 5/2005 | Shah | |

(Continued)

FOREIGN PATENT DOCUMENTS

EP 1557695 7/2005

(Continued)

OTHER PUBLICATIONS

A. M. Strivastava et al., "Scintillator Compositions of Cerium Halides, and Related Articles and Processes," filed Mar. 4, 2005, U.S. Appl. No. 11/073,110.

(Continued)

*Primary Examiner*—David P Porta
*Assistant Examiner*—Mark R Gaworecki
(74) *Attorney, Agent, or Firm*—Francis T. Coppa

(57) ABSTRACT

A scintillator composition is described, including a matrix material and an activator. The matrix material includes at least one lanthanide halide compound. The matrix can also include at least one alkali metal, and in some embodiments, at least one alkaline earth metal. The composition also includes a praseodymium activator for the matrix. Radiation detectors that include the scintillators are disclosed. A method for detecting high-energy radiation with a radiation detector is also described.

44 Claims, 2 Drawing Sheets

U.S. PATENT DOCUMENTS

| | | | |
|---|---|---|---|
| 2005/0188914 | A1 | 9/2005 | Iltis et al. |
| 2006/0104880 | A1* | 5/2006 | Iltis .......................... 423/263 |
| 2006/0226368 | A1* | 10/2006 | Srivastava et al. ....... 250/361 R |

FOREIGN PATENT DOCUMENTS

| | | |
|---|---|---|
| WO | WO 01/60944 | 8/2001 |
| WO | WO 01/60945 | 8/2001 |

OTHER PUBLICATIONS

A. M. Srivastava et al., "Scintillator Compositions, Intillator Materials Which are Useful for Detecting Radiation, and Related Methods and Articles," filed Dec. 15, 2005, U.S. Appl. No. 10/301,232.

A. M. Srivastava et al, "Scintillator Compositions, and Related Processes and Articles of Manufacture," filed May 15, 2003, U.S. Appl. No. 10/689,361.

EP Search Report, EP 07110588, Jun. 18, 2008.

J. Legendziewicz et al., "Optical absorption and emission spectroscopy of the ternary praseodymium bromides: $K_2PrBr_5$ and $K_2Pr_xLa_{1-x}Br_5$ types," Optical Materials, Elsevier Science Publishers B.V. Amsterdam. NL, vol. 24, No. 1-2, Oct. 1, 2003, XP004463636, ISSN: 0925-3467. pp. 197-207.

J. Cybinska et al., "Simulation of the Crystal Field Effect on the $Pr^{3+}$ ion in $K_2La_{1-x}Pr_xCl_5$ ternary chlorides," Journal of Alloys and Compounds, Elsevier Sequoia, Lausanne, CH, vol. 380, No. 1-2, XP004583247, ISSN: 0925-8388, Oct. 20, 2004, pp. 27-33.

J. Cybinska et al., "Assignment of spectroscopic properties in praseodymium-doped and praseodymium/ytterbium-co-doped ternary $K_2LaX_5$ (X=Cl,Br, I) Halides," Optical Materials, Elsevier Science Publishers B.V. Amsterdam, NL, vol. 28, No. -2, Jan. 1, 2006, XP005089369, ISSN: 0925-3467, pp. 41-52.

P. Dorenbros et al., "Scintillation properties of some $Ce^{3+}$ and $Pr^{3+}$ doped inorganic crystals," Nuclear Science Symposium and Medical Imaging Conference, 1992, Conference Record of the 1992 IEEE Orlando, Florida, USA, Oct. 25, 1992, XP010108406, ISBN: 978-0-7803-0884-8, pp. 281-283.

J. Glodo et al., "$LaBr_3:Pr^{3+}$ - a New Red-Emitting Scintillator," Nuclear Science Symposium Conference Record, 2005 IEEE Wyndham El Conquistador Resort, Puerto Rico, Oct. 23-29, 2005, Piscataway, NJ, vol. 1, XP010895551. ISBN: 978-0-7803-9221-2, pp. 98-101.

* cited by examiner

SCINTILLATOR COMPOSITIONS BASED ON LANTHANIDE HALIDES, AND RELATED METHODS AND ARTICLES

BACKGROUND

The invention relates generally to luminescent materials and, more particularly, to scintillator compositions which are especially useful for detecting gamma-rays and X-rays under a variety of conditions.

Scintillators can be used to detect high-energy radiation, in processes, which are both very simple and very accurate. The scintillator materials are in common use as a component of radiation detectors for gamma-rays, X-rays, cosmic rays, and particles characterized by an energy level of greater than about 1 keV. The scintillator crystal is coupled with a light-detection means, i.e., a photodetector. When photons from a radionuclide source impact the crystal, the crystal emits light. The photodetector produces an electrical signal proportional to the number of light pulses received, and to their intensity.

The scintillators have been found to be useful for applications in chemistry, physics, geology, and medicine. Specific examples of the applications include positron emission tomography (PET) devices; well-logging for the oil and gas industry, and various digital imaging applications. Scintillators are also being investigated for use in detectors for security devices, e.g., detectors for radiation sources, which may indicate the presence of radioactive materials in cargo containers.

The composition of the scintillator is critical to device performance in all of these applications. The scintillator must be responsive to X-ray and gamma ray excitation. Moreover, the scintillator should possess a number of characteristics, which enhance radiation detection. For example, most scintillator materials must possess high light output, short decay time, high "stopping power", and acceptable energy resolution. (Other properties can also be very significant, depending on how the scintillator is used, as mentioned below).

Various scintillator materials, which possess most or all of these properties have been in use over the years. Examples include thallium-activated sodium iodide (NaI (Tl)); bismuth germanate (BGO); cerium-doped gadolinium orthosilicate (GSO); cerium-doped lutetium orthosilicate (LSO); and cerium-activated lanthanide-halide compounds. Each of these materials has properties, which are very suitable for certain applications. However, many of them also have some drawbacks. The common problems are low light yield, physical weakness, and the inability to produce large-size, high quality single crystals. Other drawbacks are also present. For example, the thallium-activated materials are very hygroscopic, and can also produce a large and persistent after-glow, which can interfere with scintillator function. Moreover, the BGO materials frequently have a slow decay time. On the other hand, the LSO materials are expensive, and may also contain radioactive lutetium isotopes, which can also interfere with scintillator function.

In general, those interested in obtaining the optimum scintillator composition for a radiation detector have been able to review the various attributes set forth above, and thereby select the best composition for a particular device. (As but one example, scintillator compositions for well-logging applications must be able to function at high temperatures, while scintillators for PET devices must often exhibit high stopping power). However, the required overall performance level for most scintillators continues to rise with the increasing sophistication and diversity of all radiation detectors.

As an example, in well-logging applications, scintillator crystals must be able to function at very high temperatures, as well as under harsh shock and vibration conditions. The scintillator material should therefore have a maximized combination of many of the properties discussed previously, e.g., high light output and energy resolution. (The scintillator must also be small enough to be enclosed in a package suitable for a very constrained space). The threshold of acceptable properties has been raised considerably as drilling is undertaken at much greater depths. For example, the ability of conventional scintillator crystals to produce strong light output with high resolution can be seriously imperiled as drilling depth is increased.

It should thus be apparent that new scintillator materials would be of considerable interest, if they could satisfy the ever-increasing demands for commercial and industrial use. The materials should exhibit excellent light output. They should also possess one or more other desirable characteristics, such as relatively fast decay times and good energy resolution characteristics, especially in the case of gamma rays. Furthermore, they should be capable of being produced efficiently, at reasonable cost and acceptable crystal size.

Accordingly, a need exists for an improved scintillator material that may address one or more of the problems set forth above.

BRIEF DESCRIPTION

One embodiment of this invention relates to a scintillator composition which comprises the following, and any reaction products thereof:
(a) a matrix material, comprising:
  (i) at least one lanthanide halide; and
  (ii) at least one alkali metal; and
(b) an activator for the matrix material, comprising praseodymium.

Another embodiment relates to a scintillator composition which comprises the following, and any reaction products thereof:
(a) a matrix material, comprising:
  (i) at least one lanthanide halide; and
(b) an activator for the matrix material, comprising praseodymium.

An additional embodiment is directed to a radiation detector for detecting high-energy radiation. The radiation detector comprises a crystal scintillator. The scintillator material comprises the matrix material mentioned above, and any reaction products thereof. The scintillator further comprises an activator for the matrix material, comprising praseodymium.

The radiation detector also includes a photodetector. The photodetector is optically coupled to the scintillator, so as to be capable of producing an electrical signal in response to the emission of a light pulse produced by the scintillator.

Still another embodiment relates to a method for detecting high-energy radiation with a scintillation detector. The method comprises the following steps:
(A) receiving radiation by a scintillator crystal, so as to produce photons which are characteristic of the radiation; and
(B) detecting the photons with a photon detector coupled to the scintillator crystal.

The scintillator crystal is formed of the composition mentioned above, and further described below, along with other details regarding the various features of this invention.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
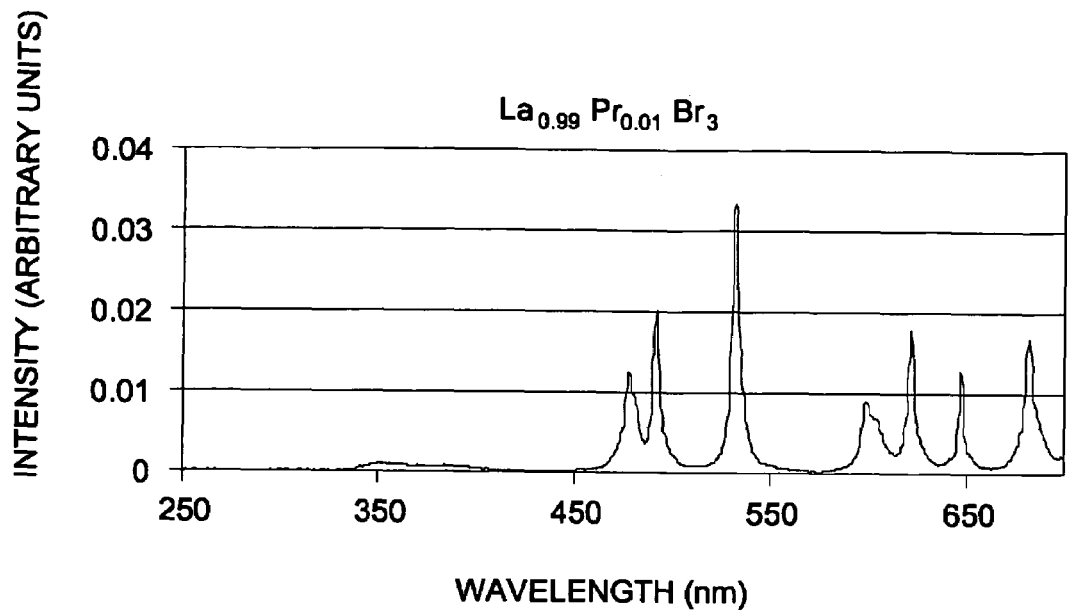
FIG. 1 is a graph of the emission spectrum (under X-ray excitation), for a scintillator composition $La_{0.99}Pr_{0.01}Br_3$ according to an embodiment of the present invention.

A matrix material for the scintillator composition comprises at least one lanthanide halide compound. The halide is either fluorine, bromine, chlorine, or iodine. Each of the individual halides may be useful for certain applications. In some embodiments, iodine is especially preferred, because of its high light output characteristics. Moreover, in other embodiments, at least two of the halides are present. Thus, the matrix material can be in the form of a solid solution of at least two lanthanide halides. As used herein, the term "solid solution" refers to a mixture of the halides in solid, crystalline form, which may include a single phase, or multiple phases. (Those skilled in the art understand that phase transitions may occur within a crystal after its formation, e.g., after subsequent processing steps like sintering or densification).

The lanthanide can be any of the rare earth elements, i.e., lanthanum, cerium, praseodymium, neodymium, samarium, europium, gadolinium, terbium, dysprosium, holmium, erbium, thulium, ytterbium, and lutetium. Mixtures of two or more of the lanthanides are also possible. (Those skilled in the art understand that yttrium is closely associated with the rare earth group. Thus, for the purpose of this disclosure, yttrium is also considered to be a part of the lanthanide family). Preferred lanthanides are selected from the group consisting of lanthanum, yttrium, gadolinium, lutetium, scandium, praseodymium, and mixtures thereof. In especially preferred embodiments, the lanthanide is lanthanum itself.

Some specific, non-limiting examples of the lanthanide halides are as follows: lutetium chloride, lutetium bromide, yttrium chloride, yttrium bromide, gadolinium chloride, gadolinium bromide, praseodymium chloride, praseodymium bromide, and mixtures thereof. However, in preferred embodiments, lanthanum halides are employed, i.e., lanthanum iodide ($LaI_3$), lanthanum bromide ($LaBr_3$), lanthanum chloride ($LaCl_3$), or some combination thereof. These materials are known in the art and commercially available, or can be prepared by conventional techniques.

When present, it is usually important that lanthanum iodide be substantially free of oxygen, or oxygen-containing compounds. (Oxygen can have a detrimental effect on the luminescence of the scintillators). As used herein, "substantially free" is meant to indicate a compound containing less than about 0.1 mole % oxygen, and preferably, less than about 0.01 mole % oxygen. Methods for ensuring that the lanthanum iodide is free of oxygen are known in the art. Exemplary techniques are described by A. Srivastava et al, in pending patent application Ser. No. 10/689,361. That application was filed on Oct. 17, 2003, and is incorporated herein by reference.

In one embodiment, the matrix material further comprises at least one alkali metal. Examples include lithium, potassium, rubidium, sodium, and cesium. Mixtures of alkali metals could also be used. In some preferred embodiments, rubidium and cesium are the preferred alkali metals, with rubidium being especially preferred.

The relative proportions of alkali metal and lanthanide halide can vary considerably. In general, the molar ratio of alkali metal (total) to lanthanide halide (total) will range from about 2.2:1.0 to about 1.8:1.0. Usually, however, the proportions will depend on stoichiometric considerations, such as valence, atomic weight, chemical bonding, coordination number, and the like. As an example, many scintillator compounds for some embodiments of the present invention have the general formula $$A_2LnX_5,$$

wherein A is at least one alkali metal; Ln is at least one lanthanide element; and X is at least one halogen. For these types of compounds, each alkali metal usually has a valence of +1; each lanthanide usually has a valence of +3; and each halogen has a valence of −1, to achieve the stoichiometric balance.

Some specific, non-limiting examples of scintillators (i.e., the matrix) for some embodiments of the present invention are as follows: $K_2LaCl_5$, $Rb_2LaCl_5$, $Cs_2LaCl_5$, $K_2LaBr_5$, $Rb_2LaBr_5$, $K_2LaI_5$, $Rb_2LaI_5$, $K_2GdCl_5$, $K_2GdBr_5$, and $Cs_2LuCl_5$. Each of these materials is thought to form in a crystal structure conducive to good scintillator function in some embodiments of the present invention (e.g., for some of the end-uses described herein).

In this embodiment, the matrix material may further comprise at least one alkaline earth metal. Examples include magnesium, calcium, strontium, and barium. Mixtures of alkaline earth metals could also be used. In some preferred embodiments, barium is the preferred alkaline earth metal.

The relative proportions of alkaline earth metal and alkali metal can vary considerably. Usually, the proportions will depend on stoichiometric considerations, such as valence, atomic weight, chemical bonding, coordination number, and the like. As a non-limiting example, many scintillator compounds for some embodiments of the present invention have the general formula $$A\beta LnX_6,$$

wherein A is at least one alkali metal; Ln is at least one lanthanide element; and X is at least one halogen. For these types of compounds, each alkali metal usually has a valence of +1; each alkaline earth metal usually has a valence +2; each lanthanide usually has a valence of +3; and each halogen has a valence of −1, to achieve the stoichiometric balance.

Other scintillator compounds do not appear to form the crystal structure most conducive to good scintillator function. However, they may achieve that structure, at least in part, in admixture with each other, or in admixture with any of the specific compounds mentioned above. Non-limiting examples of these compounds are as follows: $Cs_2LaBr_5$, $Cs_2LaI_5$, $Rb_2GdCl_5$, $Cs_2GdCl_5$, $Rb_2GdBr_5$, $Cs_2GdBr_5$, $K_2GdI_5$, $Rb_2GdI_5$ $Cs_2GdI_5$, $K_2YCl_5$, $Rb_2YCl_5$, $Cs_2YCl_5$, $K_2YBr_5$, $Rb_2YBr_5$, $Cs_2YBr_5$, $K_2YI_5$, $Rb_2YI_5$, $Cs_2YI_5$, $K_2LuCl_5$, $Rb_2LuCl_5$, $K_2LuBr_5$, $Rb_2LuBr_5$, $Cs_2LuBr_5$, $K_2LuI_5$, $Rb_2LuI_5$, and $Cs_2LuI_5$.

The scintillator composition further includes an activator for the matrix material. (The activator is sometimes referred to as a "dopant"). The activator comprises praseodymium. In many situations, the use of praseodymium is advantageous because of its light output capability and temperature stability. In addition, praseodymium in certain host lattices can have a deeper ultraviolet emission that can be better matched to silicon carbide based photosensors that are used in higher temperature applications such as in, but not limited to, downhole radiation detection.

The amount of activator present will depend on various factors, such as the particular alkali metal, the particular alkaline earth metal if present, and halide-lanthanide present in the matrix; the desired emission properties and decay time; and the type of detection device into which the scintillator is being incorporated. Usually, the activator is employed at a level in the range of about 0.1 mole % to about 20 mole %, based on total moles of activator and alkali metal-lanthanide-halide matrix material. In many preferred embodiments, the amount of activator is in the range of about 1 mole % to about 10 mole %. It is usually employed in its trivalent state, $Pr^{+3}$. The activator can be supplied in various forms e.g., halides like praseodymium chloride or praseodymium bromide.

The composition of the activator itself can comprise other materials, in addition to praseodymium. However, the activator preferably comprises at least about 80 mole % praseodymium, and most preferably, at least about 95 mole % praseodymium. In some embodiments, the activator consists essentially of praseodymium.

In another embodiment, the matrix material for the scintillator composition may comprise only a lanthanide halide compound, i.e., without any alkali metal or alkaline earth metal. The halide is either fluorine, bromine, chlorine, iodine or mixtures thereof. Each of the individual halides may be useful for certain applications. In some embodiments, iodine is especially preferred, because of its high light output characteristics. Preferred lanthanides are selected from the group consisting of lanthanum, yttrium, gadolinium, lutetium, scandium, praseodymium, and mixtures thereof. In especially preferred embodiments, the lanthanide is lanthanum itself. As in the previous embodiments, the activator comprises praseodymium.

Some specific, non-limiting examples of the lanthanide halides are as follows: lutetium chloride, lutetium bromide, yttrium chloride, yttrium bromide, gadolinium chloride, gadolinium bromide, praseodymium chloride, praseodymium bromide, and mixtures thereof. However, in preferred embodiments, lanthanum halides are employed, i.e., lanthanum iodide ($LaI_3$), lanthanum bromide ($LaBr_3$), lanthanum chloride ($LaCl_3$), or some combination thereof. These materials are known in the art and commercially available, or can be prepared by conventional techniques.

Some specific, non-limiting examples of scintillators for these embodiments of the present invention are $La_{0.99}Pr_{0.01}Br_3$, $La_{0.99}Pr_{0.01}Cl_3$, $La_{0.99}Pr_{0.01}I_3$, and $La_{0.99}Pr_{0.01}Cl_{0.03}Br_{2.97}$. Each of these materials is thought to form in a crystal structure conducive to good scintillator function in some embodiments of the present invention.

The scintillator composition may be prepared and used in various forms. In some preferred embodiments, the composition is in monocrystalline (i.e., "single crystal") form. Monocrystalline scintillation crystals have a greater tendency for transparency. They are especially useful for high-energy radiation detectors, e.g., those used for gamma rays.

The scintillator composition can be used in other forms as well, depending on its intended end use. For example, it can be in powder form. It should also be understood that the scintillator compositions may contain small amounts of impurities, as described in the previously-referenced publications, WO 01/60944 A2 and WO 01/60945 A2 (incorporated herein by reference). These impurities usually originate with the starting materials, and typically constitute less than about 0.1% by weight of the scintillator composition. Very often, they constitute less than about 0.01% by weight of the composition. The composition may also include parasitic additives, whose volume percentage is usually less than about 1%. Moreover, minor amounts of other materials may be purposefully included in the scintillator compositions.

The scintillator materials can be prepared by a variety of conventional techniques. (It should be understood that the scintillator compositions may also contain a variety of reaction products of these techniques). Usually, a suitable powder containing the desired materials in the correct proportions is first prepared, followed by such operations as calcination, die forming, sintering, and/or hot isostatic pressing. The powder can be prepared by mixing various forms of the reactants (e.g., salts, oxides, halides, oxalates, carbonates, nitrates, or mixtures thereof). In some preferred embodiments, the lanthanide and the halide are supplied as a single reactant, e.g., a lanthanide halide like lanthanum chloride, which is commercially available. As a non-limiting illustration, one or more lanthanide halides can be combined with one or more alkali metal halides (in the desired proportions), and at least one activator-containing reactant.

The mixing of the reactants can be carried out by any suitable means, which ensures thorough, uniform blending. For example, mixing can be carried out in an agate mortar and pestle. Alternatively, a blender or pulverization apparatus can be used, such as a ball mill, a bowl mill, a hammer mill, or a jet mill. The mixture can also contain various additives, such as fluxing compounds and binders. Depending on compatibility and/or solubility, various liquids, e.g., heptane or an alcohol such as ethyl alcohol, can sometimes be used as a vehicle during milling. Suitable milling media should be used, e.g., material that would not be contaminating to the scintillator, since such contamination could reduce its light-emitting capability.

After being blended, the mixture can then be fired under temperature and time conditions sufficient to convert the mixture into a solid solution. These conditions will depend in part on the specific type of matrix material and activator being used. Usually, firing will be carried out in a furnace, at a temperature in the range of about 500° C. to about 1000° C. The firing time will typically range from about 15 minutes to about 10 hours.

Firing should be carried out in an atmosphere free of oxygen and moisture, e.g., in a vacuum, or using an inert gas such as nitrogen, helium, neon, argon, krypton, and xenon. After firing is complete, the resulting material can be pulverized, to put the scintillator into powder form. Conventional techniques can then be used to process the powder into radiation detector elements.

Methods for making the single crystal materials are also well-known in the art. A non-limiting, exemplary reference is "Luminescent Materials", by G. Blasse et al, Springer-Verlag (1994). Usually, the appropriate reactants are melted at a temperature sufficient to form a congruent, molten composition. The melting temperature will depend on the identity of the reactants themselves, but is usually in the range of about 650° C. to about 1100° C.

A variety of techniques can be employed to prepare a single crystal of the scintillator material from a molten composition. They are described in many references, such as U.S. Pat. No. 6,437,336 (Pauwels et al); "Crystal Growth Processes", by J.

C. Brice, Blackie & Son Ltd (1986); and the "Encyclopedia Americana", Volume 8, Grolier Incorporated (1981), pages 286-293. These descriptions are incorporated herein by reference. Non-limiting examples of the crystal-growing techniques are the Bridgman-Stockbarger method; the Czochralski method, the zone-melting method (or "floating zone" method), and the temperature gradient method. Those skilled in the art are familiar with the necessary details regarding each of these processes.

One non-limiting illustration can be provided for producing a scintillator in single crystal form, based in part on the teachings of the Lyons et al patent mentioned above. In this method, a seed crystal of the desired composition (described above) is introduced into a saturated solution. The solution is contained in a suitable crucible, and contains appropriate precursors for the scintillator material. The new crystalline material is allowed to grow and add to the single crystal, using one of the growing techniques mentioned above. The size of the crystal will depend in part on its desired end use, e.g., the type of radiation detector in which it will be incorporated.

Another embodiment of the invention is directed to a method for detecting high-energy radiation with a scintillation detector. The detector includes one or more crystals, formed from each of the scintillator compositions described herein. Scintillation detectors are well-known in the art, and need not be described in detail here. Several references (of many) which discuss such devices are U.S. Pat. Nos. 6,585,913 and 6,437,336, mentioned above, and U.S. Pat. No. 6,624,420 (Chai et al), which is also incorporated herein by reference. In general, the scintillator crystals in these devices receive radiation from a source being investigated, and produce photons which are characteristic of the radiation. The photons are detected with some type of photodetector ("photon detector"). (The photodetector is connected to the scintillator crystal by conventional electronic and mechanical attachment systems).

The photodetector can be a variety of devices, all well-known in the art. Non-limiting examples include photomultiplier tubes, photodiodes, CCD sensors, and image intensifiers. Choice of a particular photodetector will depend in part on the type of radiation detector being fabricated, and on its intended use.

The radiation detectors themselves, which include the scintillator and the photodetector, can be connected to a variety of tools and devices, as mentioned previously. Non-limiting examples include well-logging tools and nuclear medicine devices (e.g., PET). The radiation detectors may also be connected to digital imaging equipment, e.g., pixilated flat panel devices. Moreover, the scintillator may serve as a component of a screen scintillator. For example, powdered scintillator material could be formed into a relatively flat plate which is attached to a film, e.g., photographic film. High energy radiation, e.g., X-rays, originating from some source, would contact the scintillator and be converted into light photons, which are developed on the film.

A brief discussion of several of the preferred end use applications is appropriate. Well-logging devices were mentioned previously, and represent an important application for these radiation detectors. The technology for operably connecting the radiation detector to a well-logging tube is well-known in the art. The general concepts are described in U.S. Pat. No. 5,869,836 (Linden et al), which is incorporated herein by reference. The crystal package containing the scintillator usually includes an optical window at one end of the enclosure-casing. The window permits radiation-induced scintillation light to pass out of the crystal package for measurement by the light-sensing device (e.g., the photomultiplier tube), which is coupled to the package. The light-sensing device converts the light photons emitted from the crystal into electrical pulses that are shaped and digitized by the associated electronics. By this general process, gamma rays can be detected, which in turn provides an analysis of the rock strata surrounding the drilling bore holes.

Medical imaging equipments, such as the PET devices mentioned above, represent another important application for these radiation detectors. The technology for operably connecting the radiation detector (containing the scintillator) to a PET device is also well-known in the art. The general concepts are described in many references, such as U.S. Pat. No. 6,624,422 (Williams et al), incorporated herein by reference. In brief, a radiopharmaceutical is usually injected into a patient, and becomes concentrated within an organ of interest. Radionuclides from the compound decay and emit positrons. When the positrons encounter electrons, they are annihilated and converted into photons, or gamma rays. The PET scanner can locate these "annihilations" in three dimensions, and thereby reconstruct the shape of the organ of interest for observation. The detector modules in the scanner usually include a number of "detector blocks", along with the associated circuitry. Each detector block may contain an array of the scintillator crystals, in a specified arrangement, along with photomultiplier tubes.

In both the well-logging and PET technologies, the light output of the scintillator is critical. The present invention can provide scintillator materials, which possess the desired light output for demanding applications of the technologies. Moreover, it is possible that the crystals can simultaneously exhibit some of the other important properties noted above, e.g., short decay time, high "stopping power", and acceptable energy resolution. Furthermore, the scintillator materials can be manufactured economically. They can also be employed in a variety of other devices, which require radiation detection.

EXAMPLES

The examples which follow are merely illustrative, and should not be construed to be any sort of limitation on the scope of the claimed invention.

Example 1

A 2 gram sample of a praseodymium-activated scintillator composition was prepared in this example. The matrix portion of the composition had the formula $LaBr_3$. To prepare the sample, 1.98 grams of $LaBr_3$ and 0.0201 grams of $PrBr_3$ were weighed in a glove box. The materials were thoroughly blended, and then sealed in a silver tube. Firing was carried out at about 700° C. for 5 hours, under an inert atmosphere. The nominal formula for the composition after firing was $La_{0.99}Pr_{0.01}Br_3$.

The emission spectrum for the sample was determined under X-ray excitation, using an optical spectrometer. FIG. 1 is a plot of wavelength (nm) as a function of intensity (arbitrary units). The peak emission wavelengths for the sample were about 490 nm and about 540 nm. These emission characteristics are a clear indication that the compositions described herein would be very useful for a variety of devices employed to detect gamma rays.

Example 2

A 2 gram sample of a praseodymium-activated scintillator composition was prepared in this example. The matrix portion of the composition had the formula $LaBr_3$. To prepare the sample, 1.987 grams of $LaBr_3$, and 0.0131 grams of $PrCl_3$ were weighed in a glove box. The materials were thoroughly blended, and then sealed in a silver tube. Firing was carried out at about 700° C. for 5 hours, under an inert atmosphere. The nominal formula for the composition after firing was $La_{0.99}Pr_{0.01}Cl_{0.03}Br_{2.97}$.

Figure 2:
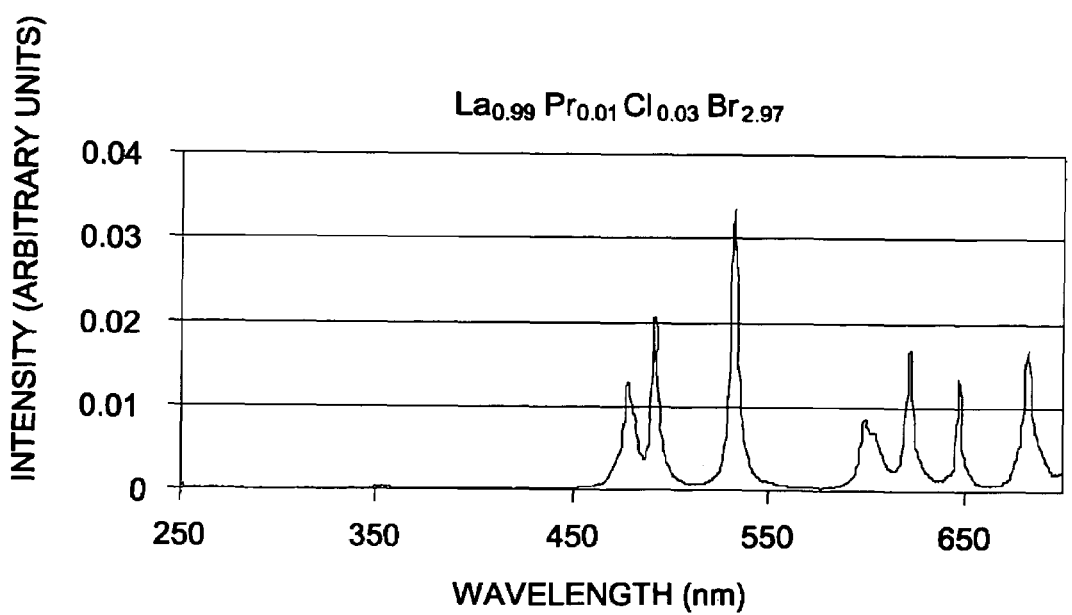
FIG. 2 is a graph of the emission spectrum (under X-ray excitation), for a scintillator composition $La_{0.99}Pr_{0.01}Cl_{0.03}Br_{2.97}$ according to an embodiment of the present invention.

The emission spectrum for the sample was determined under X-ray excitation, using an optical spectrometer. FIG. 2 is a plot of wavelength (nm) as a function of intensity (arbitrary units). The peak emission wavelengths for the sample were about 490 nm and about 540 nm. It was also determined that the scintillator composition can be excited by gamma rays, to an emission level which is characteristic of the praseodymium ion. These emission characteristics are a clear indication that the compositions described herein would be very useful for a variety of devices employed to detect gamma rays.

Example 3

A 2 gram sample of a praseodymium-activated scintillator composition was prepared in this example. The matrix portion of the composition had the formula $Rb_2LaI_5$. To prepare the sample, 0.8995 grams of RbI, 1.0784 grams of $LaI_3$, and 0.0161 grams of $PrBr_3$ were weighed in a glove box. The materials were thoroughly blended, and then sealed in a silver tube. Firing was carried out at about 700° C. for 5 hours, under an inert atmosphere. The nominal formula for the composition after firing was $Rb_2La_{0.98}Pr_{0.02}I_5$.

Figure 3:
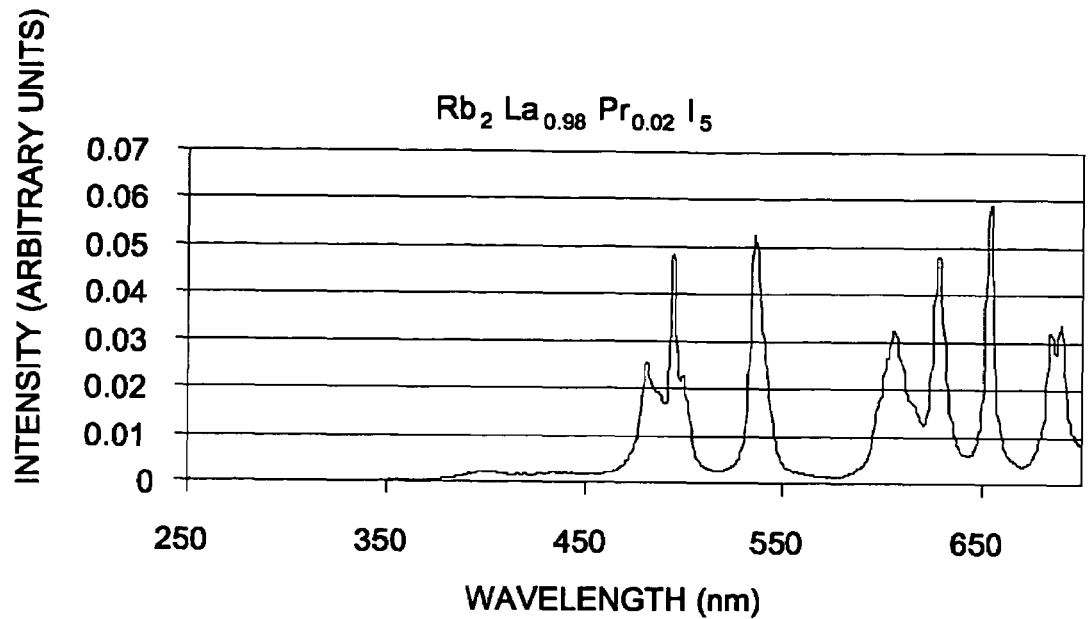
FIG. 3 is a graph of the emission spectrum (under X-ray excitation), for a scintillator composition $Rb_2La_{0.98}Pr_{0.02}I_5$ according to an embodiment of the present invention.

The emission spectrum for the sample was determined under X-ray excitation, using an optical spectrometer. FIG. 3 is a plot of wavelength (nm) as a function of intensity (arbitrary units). The peak emission wavelengths for the sample were about 540 nm and about 660 nm. These emission characteristics are a clear indication that the compositions described herein would be very useful for a variety of devices employed to detect gamma rays.

Example 4

A 2 gram sample of a praseodymium-activated scintillator composition was prepared in this example. The matrix portion of the composition had the formula $Rb_2LaBr_5$. To prepare the sample, 0.9325 grams of RbBr, 1.0461 grams of $LaBr_3$, and 0.0215 grams of $PrBr_3$ were weighed in a glove box. The materials were thoroughly blended, and then sealed in a silver tube. Firing was carried out at about 700° C. for 5 hours, under an inert atmosphere. The nominal formula for the composition after firing was $Rb_2La_{0.98}Pr_{0.02}Br_5$.

Figure 4:
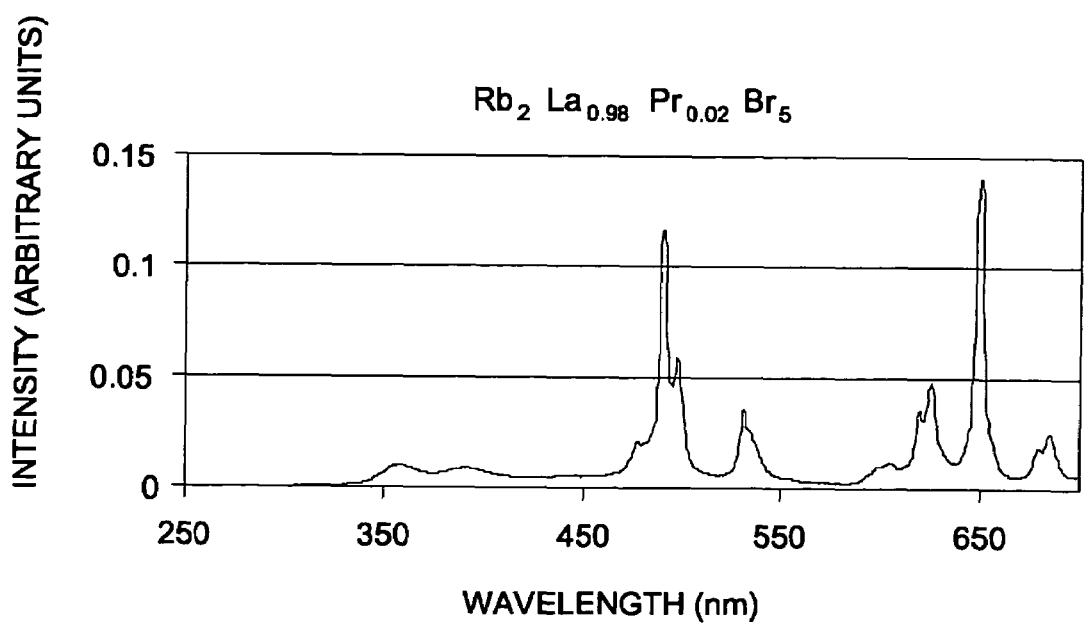
FIG. 4 is a graph of the emission spectrum (under X-ray excitation), for a scintillator composition $Rb_2La_{0.98}Pr_{0.02}Br_5$ according to an embodiment of the present invention.

The emission spectrum for the sample was determined under X-ray excitation, using an optical spectrometer. FIG. 4 is a plot of wavelength (nm) as a function of intensity (arbitrary units). The peak emission wavelengths for the sample were about 490 nm and 650 nm. These emission characteristics are a clear indication that the compositions described herein would be very useful for a variety of devices employed to detect gamma rays.

It will be apparent to those of ordinary skill in this area of technology that other modifications of this invention (beyond those specifically described herein) may be made, without departing from the spirit of the invention. Accordingly, the modifications contemplated by those skilled in the art should be considered to be within the scope of this invention. Furthermore, all of the patents, patent publications, and other references mentioned above are incorporated herein by reference.

The invention claimed is:

1. A scintillator composition, comprising the following, and any reaction products thereof:
   (a) a matrix material comprising:
      (i) at least one lanthanide halide;
      (ii) at least one alkali metal; and
   (b) an activator ion for the matrix material, comprising at least about 80 mole % praseodymium.

2. The scintillator composition of claim 1, wherein the lanthanide in the matrix material is selected from the group consisting of lanthanum, yttrium, gadolinium, lutetium and mixtures thereof.

3. The scintillator composition of claim 1, wherein the halide in the matrix material is selected from the group consisting of fluorine, bromine, chlorine, and iodine.

4. The scintillator composition of claim 1, wherein the alkali metal of component (ii) is selected from the group consisting of sodium, rubidium, cesium, and mixtures thereof.

5. The scintillator composition of claim 1, wherein the matrix material further comprises at least one alkaline earth metal.

6. The scintillator composition of claim 5, wherein the alkaline earth metal is selected from the group consisting of magnesium, calcium, strontium, barium, and mixtures thereof.

7. The scintillator composition of claim 5, wherein the matrix material comprises a compound of the formula $A\beta LnX_6$, wherein A is the alkali metal, $\beta$ is the alkaline earth metal and X is selected from the group consisting of bromine, chlorine, iodine, fluorine and combinations thereof.

8. The scintillator composition of claim 7, wherein Ln comprises lanthanum, A comprises rubidium, $\beta$ comprises barium, and X comprises iodine.

9. The scintillator composition of claim 5, wherein the matrix material comprises a compound of the formula $Cs_2\beta X_4$ or $Cs\beta_2 X_5$, wherein $\beta$ is at least one element selected from the group consisting of alkaline earth metals; and X is selected from the group consisting of bromine, chlorine, iodine, fluorine and combinations thereof.

10. The scintillator composition of claim 9, wherein $\beta$ is barium.

11. The scintillator composition of claim 10, wherein the matrix material comprises at least one compound selected from the group consisting of $Cs_2BaBr_4$, $Cs_2BaI_4$, $CsBa_2Br_5$, $CsBa_2I_5$, $Cs_2Ba(Br_{1-x}I_x)_4$; $CsBa_2(Br_{1-x}I_x)_5$; and $(Cs_xK_{1-x})Ba_2Br_5$, wherein $0.01 \leq x \leq 0.99$.

12. The scintillator composition of claim 1, wherein the lanthanide halide of component (i) is selected from the group consisting of lanthanum bromide, lanthanum chloride, lanthanum iodide, lutetium chloride, lutetium bromide, yttrium chloride, yttrium bromide, gadolinium chloride, gadolinium bromide, praseodymium chloride, praseodymium bromide, and mixtures thereof.

13. The scintillator composition of claim 1, wherein the molar ratio of alkali metal (total) to lanthanide halide (total) is from about 2.2:1.0 to about 1.8:1.0.

14. The scintillator composition of claim 1, wherein the activator is present at a level in the range of about 0.1 mole % to about 20 mole %, based on total moles of activator and matrix material.

15. The scintillator composition of claim 1, in substantially monocrystalline form.

16. The scintillator composition of claim 1, wherein the matrix material comprises a compound of the formula $$A_2LnX_5,$$

wherein A is at least one alkali metal, Ln is at least one lanthanide element; and X is selected from the group consisting of chlorine, iodine, fluorine, and combinations thereof.

17. The scintillator composition of claim 16, wherein A comprises rubidium and Ln comprises lanthanum.

18. The scintillator composition of claim 1, wherein the matrix material comprises a compound of the formula $$Rb_2LnX_5,$$

wherein Ln is at least one lanthanide element, and X is selected from the group consisting of bromine, chlorine, iodine, fluorine and combinations thereof.

19. The scintillator composition of claim 18, wherein Ln comprises lanthanum.

20. A scintillator composition, comprising the following, and any reaction products thereof:
(a) a matrix material comprising:
(i) at least one lanthanide halide; and
(b) an activator ion for the matrix material, comprising at least about 80 mole % praseodymium.

21. The scintillator composition of claim 20, wherein the lanthanide in the matrix material is selected from the group consisting of lanthanum, yttrium, gadolinium, lutetium and mixtures thereof.

22. The scintillator composition of claim 20, wherein the halide in the matrix material is selected from the group consisting of fluorine, bromine, chlorine, iodine, and mixtures thereof.

23. The scintillator composition of claim 20, wherein the lanthanide halide of component (i) is selected from the group consisting of lanthanum bromide, lanthanum chloride, lanthanum iodide, lutetium chloride, lutetium bromide, yttrium chloride, yttrium bromide, gadolinium chloride, gadolinium bromide, praseodymium chloride, praseodymium bromide, and mixtures thereof.

24. A radiation detector for detecting high-energy radiation, comprising:
(A) a crystal scintillator which comprises the following composition, and any reaction products thereof:
(a) a matrix material, comprising:
(i) at least one lanthanide halide;
(ii) at least one alkali metal; and
(b) an activator for the matrix material, comprising at least about 80 mole % praseodymium; and
(B) a photodetector optically coupled to the scintillator, so as to be capable of producing an electrical signal in response to the emission of a light pulse produced by the scintillator.

25. The radiation detector of claim 24, wherein the matrix material comprises a compound of the formula $$A_2LnI_5,$$

wherein A is at least one alkali metal, and Ln is at least one lanthanide element.

26. The radiation detector of claim 24, wherein the matrix material comprises $Rb_2LaI_5$.

27. The radiation detector of claim 24, wherein the matrix material further comprises at least one alkaline earth metal.

28. The radiation detector of claim 24, wherein the photodetector is at least one device selected from the group consisting of a photomultiplier tube, a photodiode, a CCD sensor, and an image intensifier.

29. The radiation detector of claim 24, operably connected to a well-logging tool.

30. The radiation detector of claim 24, operably connected to a nuclear medicine apparatus.

31. The radiation detector of claim 30, wherein the nuclear medicine apparatus comprises a positron emission tomography (PET) device.

32. The radiation detector of claim 24, wherein the halide of component (A)(a)(i) is selected from the group consisting of chlorine, iodine, fluorine, and combinations thereof.

33. The radiation detector of claim 24, wherein the alkali metal of component (A)(a)(ii) is selected from the group consisting of sodium, rubidium, cesium, and mixtures thereof.

34. A radiation detector for detecting high-energy radiation, comprising:
(A) a crystal scintillator which comprises the following composition, and any reaction products thereof:
(a) a matrix material, comprising:
(i) at least one lanthanide halide; and
(b) an activator for the matrix material, comprising at least about 80 mole % praseodymium; and
(B) a photodetector optically coupled to the scintillator, so as to be capable of producing an electrical signal in response to the emission of a light pulse produced by the scintillator.

35. The radiation detector of claim 34, wherein the lanthanide in the matrix material is selected from the group consisting of lanthanum, yttrium, gadolinium, lutetium and mixtures thereof.

36. The radiation detector of claim 34, wherein the halide in the matrix material is selected from the group consisting of fluorine, bromine, chlorine, iodine, and mixtures thereof.

37. A method for detecting high-energy radiation with a scintillation detector, comprising the steps of:
(A) receiving radiation by a scintillator crystal, so as to produce photons which are characteristic of the radiation; and
(B) detecting the photons with a photon detector coupled to the scintillator crystal;
wherein the scintillator crystal is formed of a composition comprising the following, and any reaction products thereof:
(a) a matrix material, comprising:
(i) at least one lanthanide halide;
(ii) at least one alkali metal; and
(b) an activator for the matrix material, comprising at least about 80 mole % praseodymium.

38. The method of claim 37, wherein:
the halide in the matrix material is selected from the group consisting of bromine, chlorine, iodine and fluorine;
the lanthanide in the matrix material is selected from the group consisting of lanthanum, yttrium, gadolinium, lutetium, scandium, and mixtures thereof; and
the alkali metal in the matrix material is selected from the group consisting of sodium, potassium, rubidium, cesium, and mixtures thereof.

39. The method of claim 37, wherein the scintillation detector is operably connected to a well-logging tool or a nuclear medicine apparatus.

40. The method of claim 37, wherein the matrix material comprises at least one alkaline earth metal.

41. The method of claim 40, wherein the alkaline earth metal in the matrix material is selected from the group consisting of magnesium, calcium, strontium, barium, and mixtures thereof.

42. A method for detecting high-energy radiation with a scintillation detector, comprising the steps of:
(A) receiving radiation by a scintillator crystal, so as to produce photons which are characteristic of the radiation; and
(B) detecting the photons with a photon detector coupled to the scintillator crystal;
wherein the scintillator crystal is formed of a composition comprising the following, and any reaction products thereof:
   (a) a matrix material, comprising:
      (i) at least one lanthanide halide; and
   (b) an activator for the matrix material, comprising at least about 80 mole % praseodymium.

43. A scintillator composition, comprising the following, and any reaction products thereof:
   (a) a matrix material comprising:
      (I) at least one lanthanide halide;
      (II) at least one alkali metal; and
      (III) at least one alkaline earth metal; and
   (b) an activator for the matrix material, comprising praseodymium.

44. A radiation detector for detecting high-energy radiation, comprising:
(A) a crystal scintillator which comprises the following composition, and any reaction products thereof:
   (a) a matrix material, comprising:
      (i) at least one lanthanide halide;
      (ii) at least one alkali metal; and
      (iii) at least one alkaline earth metal;
   (b) an activator for the matrix material, comprising praseodymium; and
(B) a photodetector optically coupled to the scintillator, so as to be capable of producing an electrical signal in response to the emission of a light pulse produced by the scintillator.

* * * * *